United States Patent [19]

Odaka

[11] Patent Number: 4,955,022
[45] Date of Patent: Sep. 4, 1990

[54] ENCODING APPARATUS AND METHOD FOR ERROR CORRECTION

[75] Inventor: Kentaro Odaka, Tokyo, Japan

[73] Assignee: Sony Corporation, Tokyo, Japan

[21] Appl. No.: 252,807

[22] Filed: Sep. 30, 1988

[30] Foreign Application Priority Data

Oct. 6, 1987 [JP] Japan .................. 62-251908

[51] Int. Cl.⁵ .............................................. G06F 11/10
[52] U.S. Cl. ...................................................... 371/37.4
[58] Field of Search .................. 371/37.4, 37.5, 37.7, 371/38.1, 39.1, 37.1

[56] References Cited

U.S. PATENT DOCUMENTS

| | | | |
|---|---|---|---|
| 4,551,771 | 11/1985 | Machida et al. | 360/19.1 |
| 4,562,578 | 12/1985 | Odaka | 371/37.7 X |
| 4,630,272 | 12/1986 | Fukami et al. | 371/37 |
| 4,682,332 | 7/1987 | Okamoto et al. | 371/38 |
| 4,712,215 | 12/1987 | Joshi | 371/37.1 |
| 4,750,178 | 6/1988 | Sako | 371/37.7 X |
| 4,802,169 | 1/1989 | Suzuki | 371/37.2 |

*Primary Examiner*—Jerry Smith
*Assistant Examiner*—Robert W. Beausoliel
*Attorney, Agent, or Firm*—Philip M. Shaw, Jr., Ltd.

[57] ABSTRACT

There is provided an encoding apparatus and method for error correction in which encoding is performed such that information symbols are respectively included in different first and second error correction code series, and one block is formed by header data including at least a block address for discrimination of a block and a data portion which does not include the address and consists of main data, the encoding apparatus comprising means for forming the first error correction code series including first parity data for a set of symbols in which a plurality of said blocks are arranged with respect to all of the symbols included in the blocks, and forming the second error correction code series including second parity data with regard to a part of the header data and all of the main data portion.

According to the invention, a part of the main data can be recorded in a part of the header. Protection of the header can be made strong. In addition, reading address errors can be certainly detected.

20 Claims, 12 Drawing Sheets

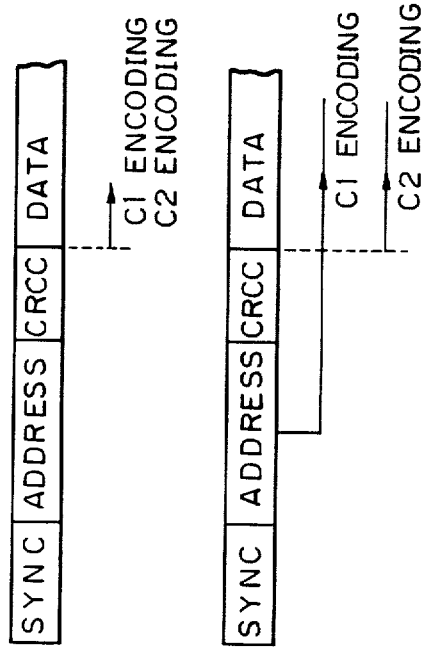
Fig. 1A PRIOR ART
Fig. 1B PRIOR ART
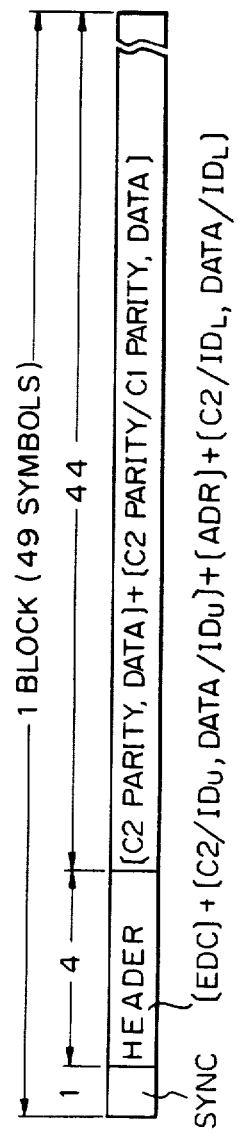
Fig. 2

Fig. 5B

| | 22 | 23 | 24 | 25 | 26 | 27 | 28 | ---------- | 58 | 59 |
|---|---|---|---|---|---|---|---|---|---|---|
| | | | | | | | SYNC | | | |
| | | | | | | | EDC | | | |
| | | | | | | | ID u | | | |
| | | | | | | | ADR | | | |
| | | | | | | | ID l | | | |
| | R1u | R441u | L3u | L443u | R3u | R443u | L5u | | R19u | R459u |
| | R21u | R461u | L23u | L463u | R23u | R463u | L25u | | R39u | R479u |
| | | | | | | | | | | |
| | | | | | ODD WORD AREA | | | | | |
| | | | | | | | | | | R799u |
| | | R761l | | | | | | | | R779l |
| | | R781l | | | | | | | | R799l |
| | | | C1 | | C1 | | C1 | | | C1 |
| | | | PARITY | | PARITY | | PARITY | | | PARITY |

Fig. 5C

| 60 | 61 | 62 | 63 | 64 | 65 | 66 | 67 | 68 --- |
|---|---|---|---|---|---|---|---|---|
| L 2u | L442u | R 2u | R442u | L 4u | L444u | R 4u | R444u | L 6u |
| L22u | L462u | R22u | R462u | L24u | L464u | R24u | R464u | L26u |
| L 2l | | | | | | | | |
| L22l | | | | | | | | |

Y    P

| | C1 PARITY | | C1 PARITY | | C1 PARITY | | C1 PARITY | |

Fig. 5D

| | | 96 | 97 | 98 | 99 |
|---|---|---|---|---|---|
| SYNC | | | | | |
| EDC | | | | | |
| IDu | | | LOu | | ROu |
| ADR | | | | | |
| IDl | | | LOl | | ROl |
| | | L20u | L460u | R20u | R460u |
| | | L40u | L480u | R40u | R480u |
| EVEN WORD AREA | | | Q | | |
| | | | L800u | | R800u |
| | | | L800l | | R800l |
| | | | C1 PARITY | | C1 PARITY |

| | 0 | ——— 19 | 20 | 21 | ——————— |
|---|---|---|---|---|---|
| | SYNC | | | | SYNC |
| 0 | EDC | | | | EDC |
| 1 | C2 PARITY or IDu | | | | IDu |
| 2 | ADR | | | | ADR |
| 3 | C2 PARITY or IDl | | | | IDl |
| 4 | | | L1u | | |
| 5 | | | L25u | | |
| ⋮ | C2 PARITY | | | | |
| 37 | | | | | |
| 38 | | C1 PARITY | | C1 PARITY | |
| 39 | | | | | |
| 40 | | | | | |
| 41 | | | | | |
| 42 | | | | | |
| 43 | | | | | |
| 44 | | | | | |
| 45 | | | | | |
| 46 | | | | | |
| 47 | | | | | |

Fig. 9B

| | 66 | 67 | 68 — — — — — — — — — — — | 113 | 114 | 115 |
|---|---|---|---|---|---|---|
| | | | SYNC | | | |
| | | | EDC | | | |
| | | | IDu | LOu | | ROu |
| | | | ADR | | | |
| | | | IDl | LOl | | ROl |
| | R23u | L2u | | | R24u | |
| | R47u | L26u | | | R48u | |
| | | | | | | |
| | L959u | | | | | ✕ |
| | L959l | | | | | ✕ |
| | C1 PARITY | | | C1 PARITY | | C1 PARITY |

ENCODING APPARATUS AND METHOD FOR ERROR CORRECTION

BACKGROUND OF THE INVENTION

1. Field of the Invention

The present invention relates to an encoding apparatus and method for error correction which is applied to record, for instance, audio PCM signals onto a magnetic tape by rotary heads and, more particularly, to an apparatus and method for error correction which is provided in a digital encoder to record high quality audio PCM data, as disclosed in U.S. Pat. No. 4,551,771.

2. Description of the Prior Art

There is a known error correction encoding apparatus and method for use with information symbols arranged two-dimensionally in a matrix form in which encoding processes of error detection and error correction codes, e.g., Reed Solomon codes are executed in each of the vertical and lateral directions of the information symbols. These codes are transmitted for each column in the vertical direction. On the reception side, the error correction is performed by using a first error detection code and a first error correction code and, at the same time, a pointer indicative of the presence or absence of errors is formed. Next, the errors are corrected by a second error detection code and a second error correction code with reference to this pointer.

In the case where the foregoing error correction encoded data is transmitted for each column, a sync signal and sub-data such as a block address and the like are added to thereby form one block of data. For example, in U.S. Pat. No. 4,630,272, there is shown a method whereby a sync signal and an address in which error detection can be independently performed by a CRC code are added to each column of data and to the parity data of a first error correction code, thereby forming one block. In the above U.S. Patent, as shown in FIG. 1A herein, for the address, the error detection can be executed by the CRC code and for a data portion (PCM audio signals), encoding processes of a first error correction code (referred to as a C1 code) and a second error correction code (referred to as a C2 code) are performed. In the case of the encoding by FIG. 1A, however, since the C1 code is not applied to the address, the protection against errors is insufficient.

To solve this problem, for example, as disclosed in U.S. Pat. No. 4,682,332 and as shown herein in FIG. 1B, an error correction encoding is proposed in which an encoding by a C1 code is also executed for the address. When a header consists of only an address, the error correction encoding shown in FIG. 1B is useful. However, if PCM audio signals (main data) are included in the header in addition to the address, the encoding by the C1 code is only executed for the main data and there is a problem in that the protection for errors is insufficient for a reason to be mentioned later. Encoding by the C2 code of the whole header, including the address, to eliminate this drawback causes an inconvenience in that the data area in which the addresses are recorded is lost by the existence of the C2 parity.

OBJECTS AND SUMMARY OF THE INVENTION

It is, therefore, an object of the present invention to provide an encoding apparatus and method for error correction in which a whole header together with a data portion is C1 encoded and the encoding by a C2 code is performed for the main data included in the header, excluding addresses, thereby enabling error protection for the main data included in the header part to be made strong, so that main data can be recorded into the header part.

According to the present invention there is provided an encoding apparatus and method for error correction of the type in which encoding is performed such that information symbols are respectively included in different first and second error correction code series, and one data block is formed by header data including at least a block address to allow discrimination of the block and a data portion which does not include the address and consists of main data. Thus the encoding apparatus comprises means for forming the first error correction code series, including first parity data for a set of symbols in which a plurality of the data blocks are arranged with respect to all of the symbols included in the data blocks, and the second error correction code series, including second parity data with regard to a part of the header data and all of the main data portion.

One block is formed by: a header consisting of a block address, an ID signal, and data; and a data block consisting of only main data. Encoding by the first error correction code (C1 code) is performed for all of the symbols in a two-dimensional array of symbols in which a plurality of blocks are arranged. Therefore, all of the symbols can be error corrected by the C1 code. Encoding by the C2 code is performed for the main data included in the header and the main data in the data part. Accordingly, the main data is strongly protected from error, since the main data is encoded by the C1 code and the C2 code. This enables the header to include the main data, thereby increasing the degree of freedom in the frame arrangement of the code.

The objects, features and advantages of the present invention will become apparent from the following detailed description taken in conjunction with the accompanying drawings.

BRIEF DESCRIPTION OF THE DRAWINGS

FIGS. 1A and 1B are schematic diagrams of prior art error correction encoding schemes which are used in an explanation of a conventional error correction code;

FIG. 2 is a schematic diagram showing a block constitution of an embodiment of the present invention;

FIGS. 5A, 5B, 5C, 5D and 6 are schematic diagrams which are used in the explanation of an example of the interleave of data;

FIGS. 9A and 9B are schematic diagrams of another example of a frame constitution according to the invention.

DESCRIPTION OF THE PREFERRED EMBODIMENT

An embodiment of the present invention will be described hereinbelow with reference to the drawings.

This description will be made in accordance with the following order:
  a. A block constitution and a frame constitution.
  b. An example of data interleave.
  c. An example of the constitution of a header.
  d. A recording circuit.
  e. A modification a. A block constitution and a frame constitution.

FIG. 2 shows a constitution of one block of data, e.g., audio data which is recorded onto a magnetic tape. This block corresponds to the amount of PCM data recorded in one track of the magnetic tape. One block consists of 49 symbols. A block sync signal of one symbol is located at the head of one block. Next, a header of four symbols is located. Then, a data portion of 44 symbols is located. As will be explained later, the header comprises: an ID signal, data, or a C2 parity; a block address ADR; and an error detection code EDC such as simple parity, CRC, or the like for them. The data portion comprises: data (audio PCM signals) or a C2 parity; or data or a C2 parity and a C1 parity.

Figure 3:
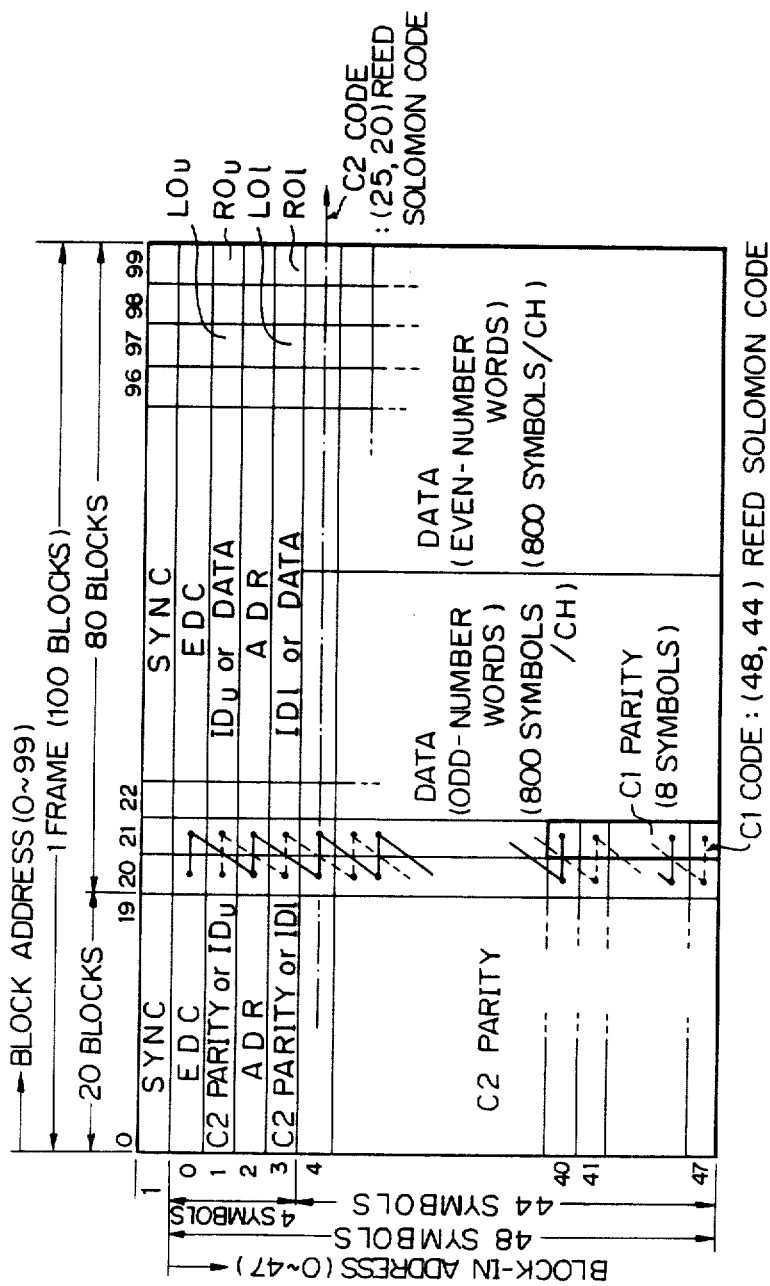
FIG. 3 is a schematic diagram showing a frame constitution of the embodiment of the invention.

As shown in FIG. 3, one frame is constructed by arranging the above-mentioned blocks into 100 columns. Block-in-addresses of 0 to 47 are added to 48 symbols in the vertical direction, excluding the block sync signal, in a matrix-shaped frame construction, and block addresses 0 to 99 are added to 100 blocks in the lateral direction.

The audio PCM signals and C1 parity are included in 44 symbols ×80 blocks in the block addresses 20 to 99 and block-in addresses 4 to 47. When the sampling frequency is 48 kHz, the PCM audio signals of one field of the NTSC system are set to $$48,000 \times \frac{1}{59.94} = 801 \text{ words}$$

In the case of performing a linear digitization of 16 bits, each word is divided into an upper eight bits and a lower eight bits and one symbol is set to eight bits. On the other hand, when one word consists of 12 bits, one symbol is set to six bits. Besides 48 kHz, the sampling frequency can be set to 44.1 kHz or 32 kHz.

Referring to FIGS. 5A, 5B, 5C and 5D, symbols L0u and R0u (FIG. 5D) on the upper side of words L0 and R0 in the heads of the audio PCM signals L0 to L800, R0 to R800 of the left and right channels are set to 1 in the block-in address and are arranged in the block addresses 97 and 99. On the other hand, symbols L01 and R01 on the lower side are set to 3 in the block-in address and are arranged in the block addresses 97 and 99. Among the remaining 800 words in each channel, the 800 symbols of the odd-number designated words are arranged in the block addresses 20 to 59 and the 800 symbols of the even-number designated words are arranged in the block addresses 60 to 99.

Figure 4:
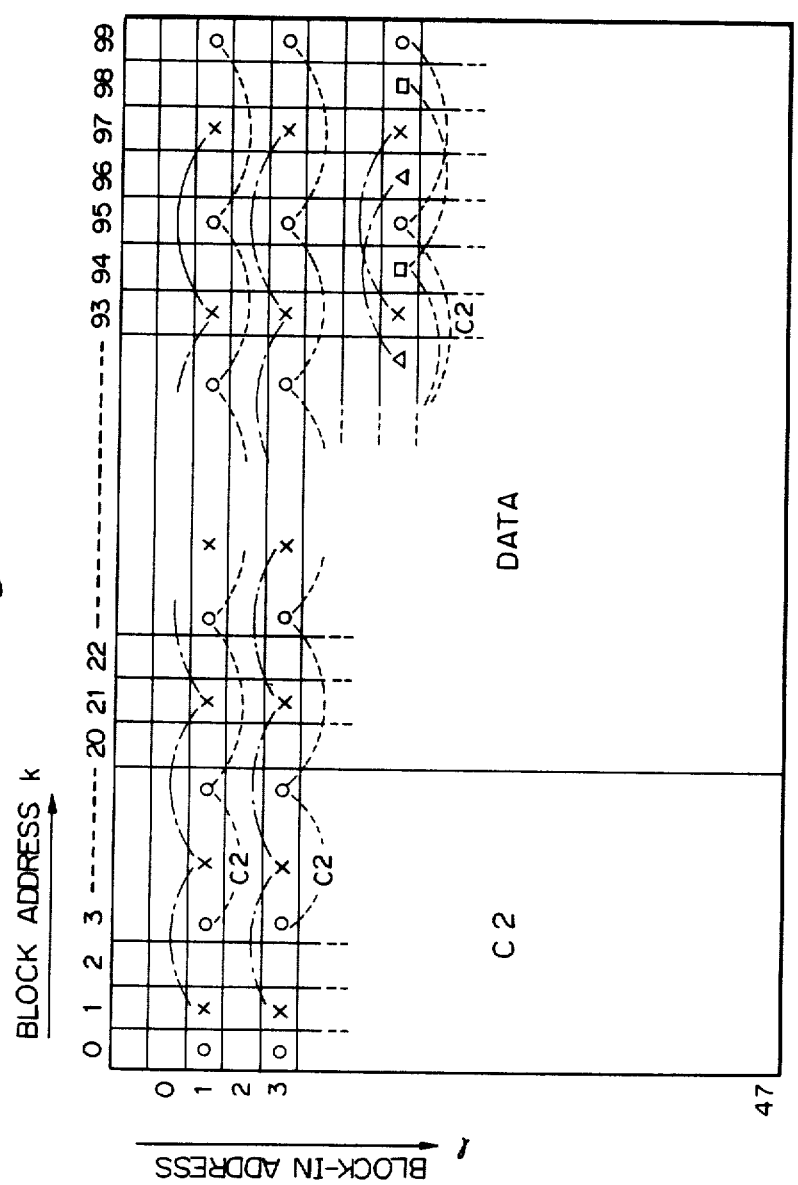
FIG. 4 is a schematic diagram which is used in the explanation of the formation of a C2 code.

The parity (C2 parity) of the second error correction code (C2 code) is included in 20 blocks ×44 symbols in the block addresses 0 to 19 and block-in addresses 4 to 47. As shown in FIG. 4, the C2 code is a (25, 20) Reed Solomon code which is formed for groups of 20 symbols, every four blocks of the symbols of which are arranged in the lateral direction. Since four series of this C2 code are formed with respect to one row, the C2 parities of 4×5=20 symbols are included in one row. Therefore, the encoding processes of the C1 code and C2 code are executed for all of the symbols of 44 symbols ×80 blocks in the block addresses 20 to 99 and block-in addresses 4 to 47.

The error detection code EDC for the header is included in the block-in address 0 and block addresses 0 to 99. The encoding process of the C2 code is not performed for the error detection code EDC.

An ID signal IDu or data L0u and R0u are included in the block-in address 1 and block addresses 20 to 99. The C2 parities of 5×2=10 symbols formed from this data are included in the block-in address 1 and block addresses 1, 3, 5, 7, ..., 17, 19. Five symbols are needed for each of data L0u and R0u. An ID signal IDu is included in the block-in address 1 and block addresses 0, 2, 4, 6, ..., 16, 18. See the upper part of FIG. 5A.

The block address ADR is included in the block-in address 2 and block addresses 0 to 99. The encoding by the C2 code is not executed for the block address ADR.

The ID signal ID1 or data L01 and R01 are included in the block-in address 3 and block addresses 20 to 99. The C2 parities of 5×2=20 symbols formed from this data are included in the block-in address 3 and block addresses 1, 3, 5, 7, ..., 17, 19. The ID signal ID1 is included in the block-in address 3 and block addresses 0, 2, 4, 6, ..., 17, 18.

The encoding by the C1 code is executed for all one hundred of the blocks in a manner similar to the method described in U.S. Pat. No. 4,630,272. The C1 code is a (48, 44) Reed Solomon code. The series of this C1 code is constructed so as to exist in two adjacent blocks. That is, one C1 series is formed by the even-number designated symbols 0, 2, 4, 6, ... of the block-in address of the series of symbols of two adjacent blocks (e.g., blocks 20 and 21 shown in FIG. 6). Another C1' series is formed by the odd-number designated symbols 1, 3, 5, 7, ... of the block-in address. The reason why the C1 series are formed so as to exist in two blocks is to prevent the two symbols in one C1 series from becoming errors due to errors generated at the boundary of two continuous symbols upon recording. The C1 parities (8 symbols) of two adjacent blocks are arranged in the block-in addresses 40 to 47 of the odd-number block addresses.

Upon recording, the C2 parity is formed by the data and ID signal. Next, the C1 parity is formed from these data. Upon reproduction, error detection and/or error correction is executed by means of the C1 code. A pointer is set for the symbols which cannot be error corrected. The error detection and error correction of the C2 code are executed by reference to this pointer. In addition, upon reproduction, error detection regarding the header is performed using the error detection code EDC.

The production of the C2 code will be again explained with reference to FIG. 4. As shown in FIG. 4, the block-in addresses 0, 1, ..., 47 are expressed as l and the block addresses 0, 1, ..., 99 are expressed as k. When l=0 and l=2, the encoding by the C2 code is not executed, since audio data does not exist. When l=1, only the C2 series including the data L0u and R0u (series marked by 0 and X) is formed. When l=3, only the C2 series including the data L01 and R01 (series marked by 0 and X) is formed. When l =4 to 47, the C2 series (series marked by O, X, Δ and □) is formed for all of the data.

b. An example of data interleave.

Figure 5A:
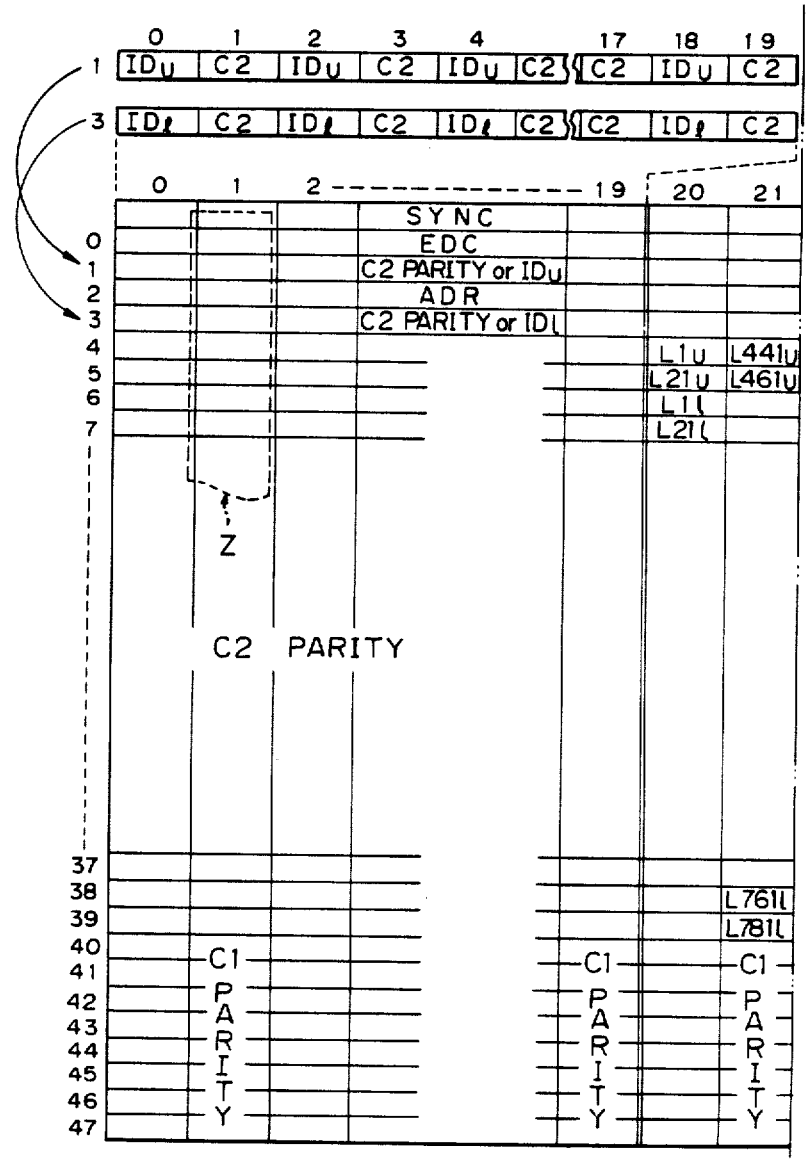
Figure 6:
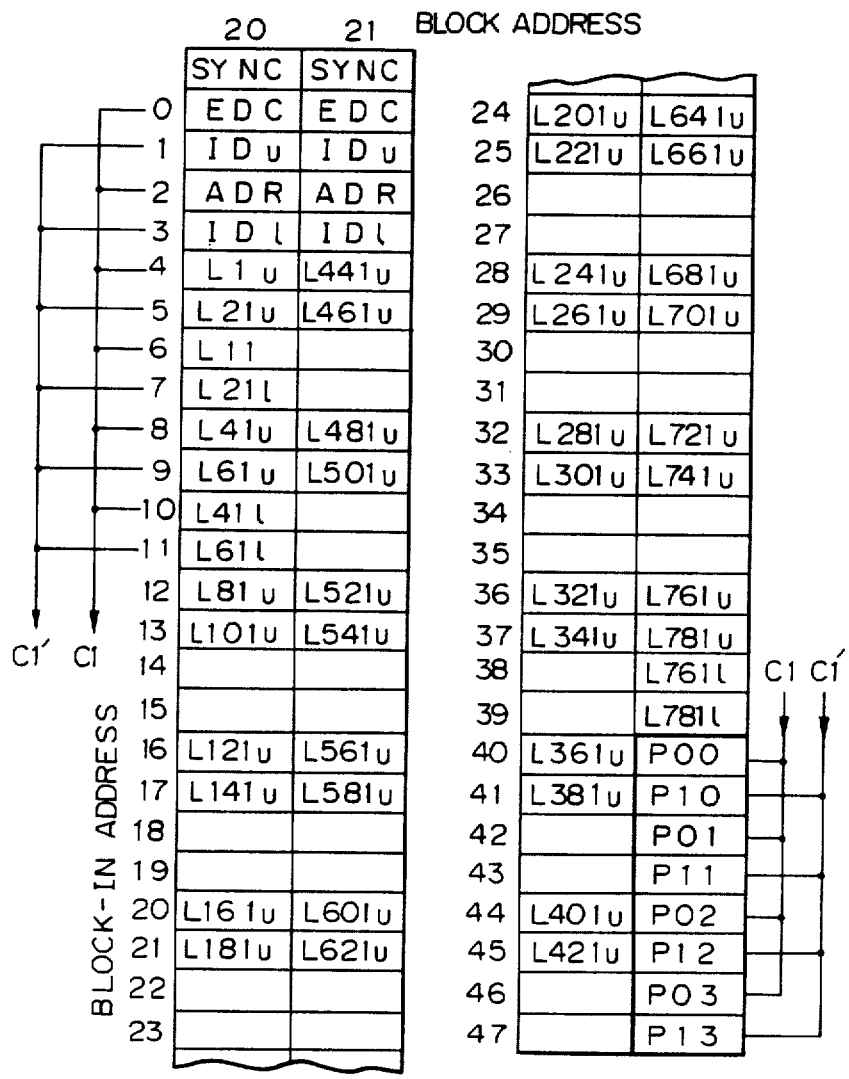

FIGS. 5 and 6 show the interleave of data of 801 words (=1602 symbols)/one channel of one field of the NTSC system in detail. FIGS. 5A and 5B show the data constitution in the block addresses 0 to 59. FIGS. 5B, 5C and 5D show that in the block addresses 60 to 99. FIG. 6 shows those in the block addresses 20 and 21 in detail.

As mentioned above, four symbols L0u, L0l, R0u, R0l of two words are positioned in the block-in addresses 1 and 3 in the block addresses 97 and 99. The odd-number designated words L1 to L799, R1 to R799 are arranged in the block addresses 20 to 59. The even-number designated words L2 to L800, R2 to R800 are arranged in the block addresses 60 to 99. By interleaving the recording positions of the odd-number designated words and even-number designated words, the poor effect caused upon reproduction when continuous words are error words can be reduced.

An example of the interleave of the symbols of the odd-number designated words will now be described. As shown in FIGS. 5A, 5B and 6, the data are sequentially arranged from the block-in addresses 4 and 6. In this case, the symbols L1u, R1u, L3u, R3u, ..., R19u on the upper side are successively arranged in the even-number designated block addresses 20, 22, 24, 26, ..., 58 in the block-in address 4. The symbols L1l, R1l, L3l, R3l, ..., R19l on the lower side are sequentially arranged in the even-number designated block addresses 20, 22, 24, 26, ..., 58 in the block-in address 6. The next odd-number designated symbols are arranged in the block-in addresses 5 and 7 in a manner similar to the above. By repeating the data arrangement in this manner, the R799u and R799l are located in the block-in addresses 37 and 39 in the block address 59.

In FIG. 6, P00 to P13 denote C1 parities regarding two blocks in the block addresses, for example, 20 and 21. That is, in the two blocks in the block addresses 20 and 21, the parities P00, P01, P02 and P03 of a (48, 44) Reed Solomon code (C1 code) are formed from the 48 symbols located in the even-number designated block-in address 20. The parities P10, P01, P12 and P13 of the (48, 44) Reed Solomon code (C1' code) are formed from the 48 symbols located in the odd-number designated block-in address 21.

As shown in FIGS. 5C and 5D, the even-number designated words are arranged in a manner similar to the odd-number designated words. The symbols R800u and R800l of the last word in the R channel are arranged in the block-in addresses 37 and 39 in the block address 99. According to the interleave shown in FIGS. 5 and 6, the recording positions of adjacent words are interleaved by four blocks in each of the even-number designated word series and odd-number designated word series in each channel. Successive recording of the upper side symbols and lower side symbols of one word is prevented. The influence of burst errors is reduced. In the actual write operation of the data into memory, odd-numbered words and even-numbered words are written into the tables shown in FIGS. 5A, 5B, 5C and 5D such as L0u, R0u, L1u, R1u, L2u, R2u, L3u, R3u, ...

c. An example of the constitution of a header.

Figure 7:
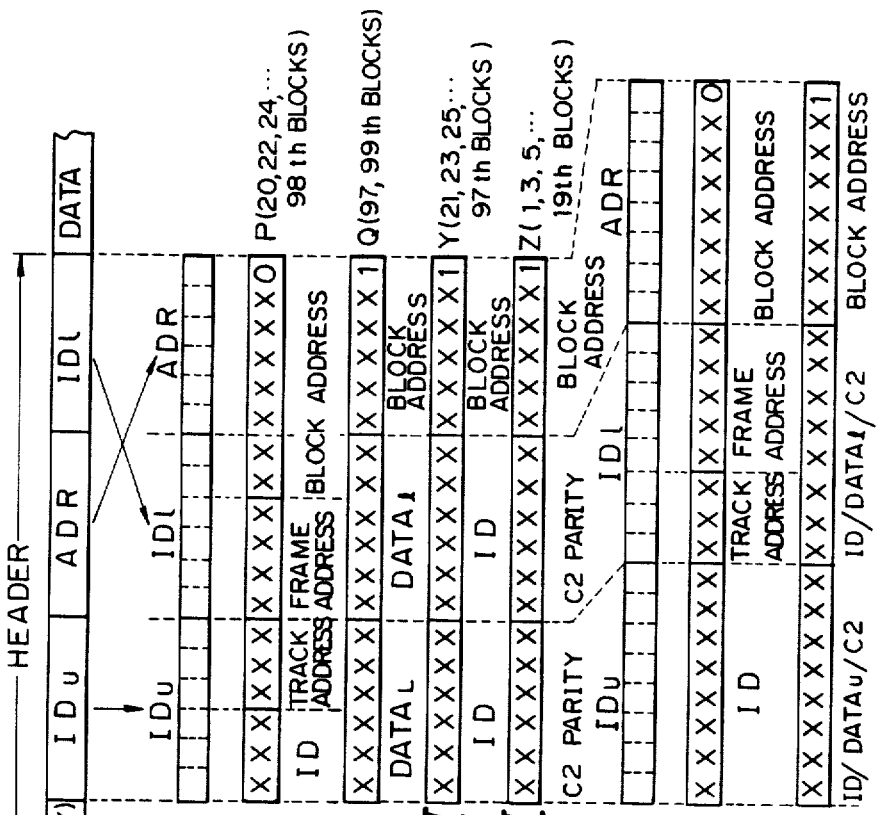
FIGS. 7A, 7B-I, 7B-II, 7B-III, 7B-IV, 7C-I and 7C-II are schematic diagrams which are used in the explanation of the constitution of a header.

FIG. 7A shows a portion of the header in one of the blocks in which C2 parity is not included. The header comprises: the ID signal IDu and IDl comprised of two symbols; the block address ADR comprised of one symbol; and a parity of the error detection code (EDC) comprised of three symbols, for instance, of a simple parity. Hereafter, this parity code is referred to as "third parity data". This error detection code is also used to detect a block sync signal. FIG. 7B shows the information of each of the three symbols IDu, IDl, and ADR when one symbol consists of six bits, i.e., one word consists of twelve bits. On the other hand, FIG. 7C shows the information of each of the three symbols IDu, IDl, and ADR when one symbol consists of eight bits, i.e., one word consists of sixteen bits.

As shown in FIG. 7B-I, when the least significant bit of the block address ADR is "0", namely, in the even number designated blocks (e.g., area P in FIG. 5C), the block address is indicated by a total of eight bits consisting of six bits of the ADR and the lower two bits of the ID. The upper four bits of the IDl are set to a frame address. The frame address indicates a track number. This frame address is used to discriminate the frame (i.e., track) in the high-speed reproducing mode in which the rotary heads scan a plurality of tracks, or in the editing mode. The lower three bits of the IDu are set to a track address. The track address, i.e., channel address, is used to discriminate a channel when one track is divided into six channels. Six kinds of compressed audio PCM signals are recorded in each of the six channels. The upper three bits of the IDu are used as an ID signal. This ID signal can be used as a head search signal to select a desired track or a time code to indicate the position of a recording signal on the tape. This ID signal can be also used to discriminate the recording mode of the recording signals, e.g., stereo/bilingual, prohibition of copy, or the like.

As shown in FIG. 7B-II, when the least significant bit of the block address ADR is "1", that is, in the odd-number designated block addresses 97, 99, including main data (e.g., area Q in FIG. 5D), the six bits of the ADR are used as a block address, which is an insufficient number of bits to express the block address. However, the correct block address can be recovered by interpolation using the block addresses of the blocks before and after this block. In this case the area of the IDu is used as symbols L0u and R0u in this embodiment on the upper side of data. The area of the IDl is used as symbols L0l and R0l in the embodiment on the lower side of data.

FIG. 7B-III shows the contents of data in the odd-numbered blocks 21, 23, 25, ..., 95 (e.g., area Y). The ID signal is the so-called sub-code data. This ID signal is used to discriminate the sampling frequency, the number of words, etc., in addition to the above-mentioned use. When three bits are not sufficient to express this control information, six bits included in the odd-numbered blocks are used.

FIG. 7B-IV shows the contents of data in the odd-numbered blocks 1, 3, 5, ..., 19 (e.g., area Z) and C2 parity is inserted in the ID area.

FIG. 7C shows the constitution of a header when one symbol consists of eight bits. In the block in which the least significant bit of the block address is "0", an ADR of 8 bits is set to a block address, the IDl is set to a track address (3 bits) and a frame address (5 bits), and the IDu is assigned to the ID signal (FIG. 7C-I). In the block in which the least significant bit of the block address is "1", the 8 bits of the are used as a block address and the IDu and IDl are assigned to the ID signal, data or C2 parity, respectively (FIG. 7C-II).

Even in any of the cases where one symbol consists of 6 bits or where one symbol consists of 8 bits, no data is included in the blocks 20, 22, 24, ..., 112 in which the least significant bit of the block address is "0", so that as mentioned above, the symbols in the block in which the least significant bit of the block address in the header is "0" are not C2 encoded. Namely, C2 encoding need not be performed, since no data is included in the blocks. In this way the block address, frame address, and track address are prevented from being lost by the C2 parity.

d. Recording circuit.

Figure 8:
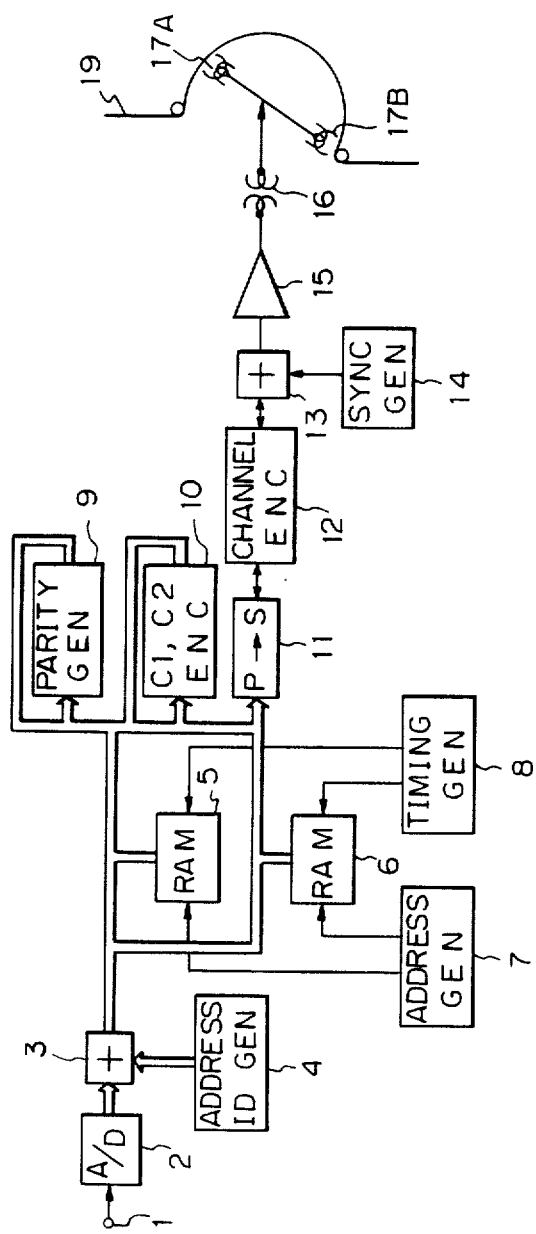
FIG. 8 is a block diagram of an example of a recording circuit.

FIG. 8 shows a constitution of a recording circuit of an embodiment of the invention. In this recording circuit analog audio signals are supplied to an input terminal indicated by 1. These analog audio signals are converted into PCM signals by an A/D converter 2. Output data from the A/D converter 2 is supplied to an adder 3. The address signal and ID signal from an address/ID generating circuit 4 are supplied to the adder 3 where they are added to the PCM audio signals.

The output signal of the adder 3 is used as a data input to RAMs 5 and 6. Each of the RAMs 5 and 6 has a capacity sufficient to store the symbols of one frame. An address generating circuit 7 and a timing generating circuit 8 are provided in conjunction with the RAMs 5 and 6 and are controlled so as to write and read out data into and from the RAMs 5 and 6 on a symbol unit basis. The reason why two RAMs 5 and 6 are provided is that for a period when data is written into one of the RAMs, data is read out of the other RAM and error correction encoded.

The audio PCM signals read out from one of the RAMs 5 and 6 are supplied to an encoder 10 of the C1 and C2 codes and the parities of the C1 and C2 codes are formed. These parities are written into either one of the RAMs 5 and 6. A parity generating circuit 9 is provided and the parity of the error detection code for three symbols included in the header is formed. After completion of the error correction encoding process, the digital signals consisting of the parity symbol, block address, ID signal, and data are read out of the RAMs 5 or 6, block by block, and supplied to a parallel/serial converter 11 where they are converted into serial data.

The output data from the parallel/serial converter 11 is supplied to a channel encoder 12 and subjected to a channel encoding process such as 8 to 10 conversion or the like. The output of the channel encoder 12 is supplied to an adding circuit 13 where a block sync signal is added from a sync generator 14. The recording signals output from the adder 13 are supplied to rotary heads 17A and 17B through a recording amplifier 15 and a rotary transformer 16, and recorded onto a magnetic tape 19 by the rotary heads 17A and 17B. The pair of rotary heads 17A and 17B are disposed with an interval of an angle of 180° therebetween. The magnetic tape 19 is run past the heads 17A and 17B at an angle range of 180° or more so as to obtain an overlapping interval of about 30°. The time-base compressed PCM audio signals are recorded in this overlapping interval.

e. Modification.

The invention is not limited to audio signals associated with the video signal of an NTSC system but can be also applied to the case where audio signals associated with the video signal of a CCIR system are recorded. In the CCIR system, since the field frequency is 50 Hz, the data of one field in the case of the sampling frequency of 48 kHz consists of 960 words, L0 to L959, R0 to R959.

FIGS. 9A and 9B shows a frame constitution in the case where the invention is applied to the CCIR system. Forty-eight symbols, excluding the block sync signal, are arranged in the vertical direction and 116 blocks are arranged in the lateral direction. The symbols of the head words L0 and R0 are included in a part of the header. The encoding by C2 code is performed for this data. The interleave of the even-number designated words and odd-number designated words, the encoding by the C1 code, and the encoding by the C2 code are similar to those in the case of the NTSC system.

In the invention, error correction codes other than the Reed Solomon code can be used.

According to the invention, the error correction code can be doubly encoded with regard to a part of a header, more concretely, main data included in the header. Therefore, the protection of the data can be made strong. This means that it is possible to include data in the header. As a result, the degree of freedom in constructing the frame can be increased. On the other hand, address errors, such as in the block address, and the like can be detected, since one error correction code series (C1 code) is generated from symbols of all blocks. Therefore, address read errors can be detected with certainty.

What is claimed is:

1. A data encoding apparatus for error correction of the type in which encoding is performed such that information symbols are respectively included in different first and second error correction code series, and one block of data is formed by header data, including at least a block address for discrimination of a data block, and main data portion which does not include said address, said encoding apparatus comprises:
   (A) first means for forming said first error correction code series (C1) including first parity data for a set of symbols in which a plurality of said blocks are arranged with respect to all of the symbols included in said blocks;
   (B) mixing means for mixing a part of said main data into said header data; and
   (C) second means, connected to the first means, for forming said second error correction code series (C2) including second parity data with regard to a part of the header data in Element (B) and all of said main data portion.

2. A data encoding apparatus for error correction according to claim 1, in which said second parity data is generated with regard to a data series of a block-in address including a part of said main data.

3. A data encoding apparatus for error correction according to claim 2, in which sub-code ID data is additionally mixed into said header data.

4. A data encoding apparatus for error correction according to claim 3, in which said sub-code has a frame address indicative of a track number in which data is recorded.

5. A data encoding apparatus for error correction according to claim 4, in which said sub-code has a channel address indicative of the channel number in the track in which data is recorded.

6. A data encoding apparatus for error correction according to claim 3 in which said second parity data is gathered in a predetermined area defined by said block address.

7. A data encoding apparatus for error correction according to claim 6, in which said sub-code ID data and data of said second parity data are arranged alternately with regard to blocks.

8. A data encoding apparatus for error correction according to claim 3, in which third parity data which can be error detected independently of the main data in the blocks is added to said header data.

9. A data encoding apparatus for error correction according to claim 8, in which said third parity data is generated from the address data in said header data and said ID data for a sub-code.

10. A data encoding a for error correction according to claim 8, in which said third parity data is generated from a part of said main data in said header data and said address data.

11. A data encoding method for error correction of the type in which encoding is performed such that information symbols are respectively included in different first and second error correction code series, and one block of data is formed by header data, including at least a block address for discrimination of a data block, and a main data portion which does not include said address, said encoding method comprising the steps of:
(A) forming said first error correction code series (C1) including first parity data for a set of symbols in which a plurality of said blocks are arranged with respect to all of the symbols included in said blocks;
(B) mixing a part of said main data into said header data; and
(C) forming said second error correction code series (C2) including second parity data with regard to a part of the header data in Step (B) and all of said main data portion.

12. A data encoding method for error correction according to claim 11, in which said second parity data is generated with regard to a data series of a block-in address including a part of said main data.

13. A data encoding method for error correction according to claim 12, further comprising the step of additionally mixing sub-code ID data into said header data.

14. A data encoding method for error correction according to claim 13, in which said sub-code has a frame address indicative of a track number in which data is recorded.

15. A data encoding method for error correction according to claim 14, in which said sub-code has a channel address indicative of the channel number in the track in which data is recorded.

16. A data encoding method for error correction according to claim 13, further comprising the step of gathering said second parity data in a predetermined area defined by said block address.

17. A data encoding method for error correction according to claim 16, further comprising the step of arranging said sub-code ID data and data of said second parity data alternately with regard to the blocks.

18. A data encoding method for error correction according to claim 13, further comprising the step of adding to said header data a third parity data which can be error detected independently of the main data in the blocks.

19. A data encoding method for error correction according to claim 8, further comprising the step of generating said third parity data from the address data in said header data and said ID data for the sub-code.

20. A data en method for error correction according to claim 19, further comprising the step of generating said third parity data from a part of said main data in said header data and said address data.

* * * * *